United States Patent
Intrator et al.

(10) Patent No.: US 12,277,395 B2
(45) Date of Patent: Apr. 15, 2025

(54) DIGITAL IMAGE ANALYSIS OF SOCIAL MEDIA POSTS USING MACHINE LEARNING MODELS FOR SENTIMENT IDENTIFICATION AND RECOMMENDED ACTIONS

(71) Applicant: NICE LTD., Ra'anana (IL)

(72) Inventors: Lior Intrator, Beer Yaakov (IL); Dalya Bell, Ra'anana (IL); Tal Haguel, Petach Tikva (IL); Neta Rosenfeld, Ra'anana (IL); Yonatan Rosen, Ra'anana (IL); Koren Gershoni, Givatayim (IL)

(73) Assignee: NICE LTD., Ra'anana (IL)

( * ) Notice: Subject to any disclaimer, the term of this patent is extended or adjusted under 35 U.S.C. 154(b) by 352 days.

(21) Appl. No.: 18/156,050

(22) Filed: Jan. 18, 2023

(65) Prior Publication Data

US 2024/0242033 A1    Jul. 18, 2024

(51) Int. Cl.
  *G06F 40/30*   (2020.01)
  *G06Q 50/00*   (2024.01)
  *G06V 30/14*   (2022.01)
  *G06V 30/262*  (2022.01)

(52) U.S. Cl.
  CPC ............. *G06F 40/30* (2020.01); *G06Q 50/01* (2013.01); *G06V 30/14* (2022.01); *G06V 30/274* (2022.01)

(58) Field of Classification Search
  USPC .................................................... 704/1–504
  See application file for complete search history.

(56) References Cited

U.S. PATENT DOCUMENTS

| | | | |
|---|---|---|---|
| 11,922,515 B1* | 3/2024 | Lombard | G06Q 40/08 |
| 11,989,502 B2* | 5/2024 | Xiao | G06F 3/04842 |
| 12,112,285 B1* | 10/2024 | Abuagla | G06Q 10/063 |
| 2021/0042662 A1* | 2/2021 | Pu | G06Q 50/01 |
| 2022/0374956 A1* | 11/2022 | Jungmeisteris | G06F 3/0482 |
| 2024/0211695 A1* | 6/2024 | Srinivasan | G06F 40/30 |
| 2024/0242033 A1* | 7/2024 | Intrator | G06Q 50/01 |

* cited by examiner

*Primary Examiner* — Marcus T Riley
(74) *Attorney, Agent, or Firm* — Haynes and Boone, LLP

(57) ABSTRACT

A machine learning (ML) system and methods are provided that are configured to correlate text data with corresponding image data for image sentiment analysis. The system includes a processor and a computer readable medium operably coupled thereto, the computer readable medium comprising a plurality of instructions stored in association therewith that are accessible to, and executable by, the processor, to perform image processing operations which include receiving image data for an image posted on a social networking platform, determining whether there is text data, performing image data extraction operations, analyzing the text data, determining and combining a score for the image and text data, determining an image sentiment or a text sentiment, calculating weighted metrics based on the image sentiment or the text sentiment, determining historical customer data interactions of the customer, and recommending one or more actions based on the weighted metrics.

20 Claims, 7 Drawing Sheets

DIGITAL IMAGE ANALYSIS OF SOCIAL MEDIA POSTS USING MACHINE LEARNING MODELS FOR SENTIMENT IDENTIFICATION AND RECOMMENDED ACTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to artificial intelligence (AI) and machine learning (ML) systems and models, such as those that may be used with image and text data, and more specifically to a system and method for identifying image and/or text sentiments from social media posts using ML models for action recommendations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Service providers, such as customer relationship management (CRM) providers and systems may utilize ML models and engines (including different neural networks (NNs), such as deep neural networks (DNNs) having trained nodes, layers, and neurons) to provide and/or manage different computing services, applications, interfaces, internal computing resources, microservices, and the like. ML models may provide predictive outputs, scores, recommendations, and/or classifications that are utilized by such computing components. In traditional ML model training, a model is trained using historical data in a batch setting, which is fitted to the data set in an initial training step. Continuous online ML model training may be done when data becomes available through live or streaming data, such as sequentially incoming data. ML engines utilizing these models may assist in automating processes performed by humans, such as by providing outputs attempting to mimic or provide similar human decision-making.

However, human users are generally required and/or utilized for certain processes and data analysis. For example, humans may review feedback and/or help requests from customers to perform outreach and assist users. When human users, agents, employees, and the like are used, they may suffer from not being able to review large data stores quickly or efficiently, and therefore may miss certain requests, outreach opportunities, and other customer engagements. Conversely, ML models and other AI rules, models, systems, or engines may not completely mimic human thought and decision-making, such as by being unable to understand certain phrases, tones, sarcasm, humor, slang, emojis, or the like, which may lead to incorrect recommendations for engagement with users.

In a CRM system that may provide communications, call centers, outreach, recommendations, and other actions with customers, digital content, including online content such as social media and/or networking posts, comments, images, videos, and other interactions, may be used to determine such actions to execute or perform with customers. For example, a social media post may include an image with a description or other text post, and metadata for the post and/or image, which may indicate a certain sentiment that the user has with the corresponding business or organization, as well as particular customer journey or interactions with the organization, event, object, another user, and/or the like. These may be managed by digital channel managers (DCMs) that may correspond to automated computing operations and/or manual user analysis for tracking, analyzing, and engaging with social media posts and customers based on their social media posts.

As such, DCMs may require an understanding of the combination of text and image posts on social media and networking platforms in order to provide customers with valuable and actionable insights based on the customers' sentiment on social media and networking platforms. A combination of text and image analytics for sentiments may create a complete overview of social media posts. It may be beneficial for the DCM to automate operations with social media posts instead of manually tracking and analyzing image and other social media posts. Moreover, the DCM may be required to quickly respond to different and/or negative sentiment using recommendation options and actions, such as by monitoring a customer's journey experience and engaging with the customer through recommended actions. Thus, there is a need for a real-time scan and sentiment analysis of social media posts, including image posts and comments, using AI techniques, including NNs and other ML models, to more efficiently provide recommendations on the best course of action for a DCM to take.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
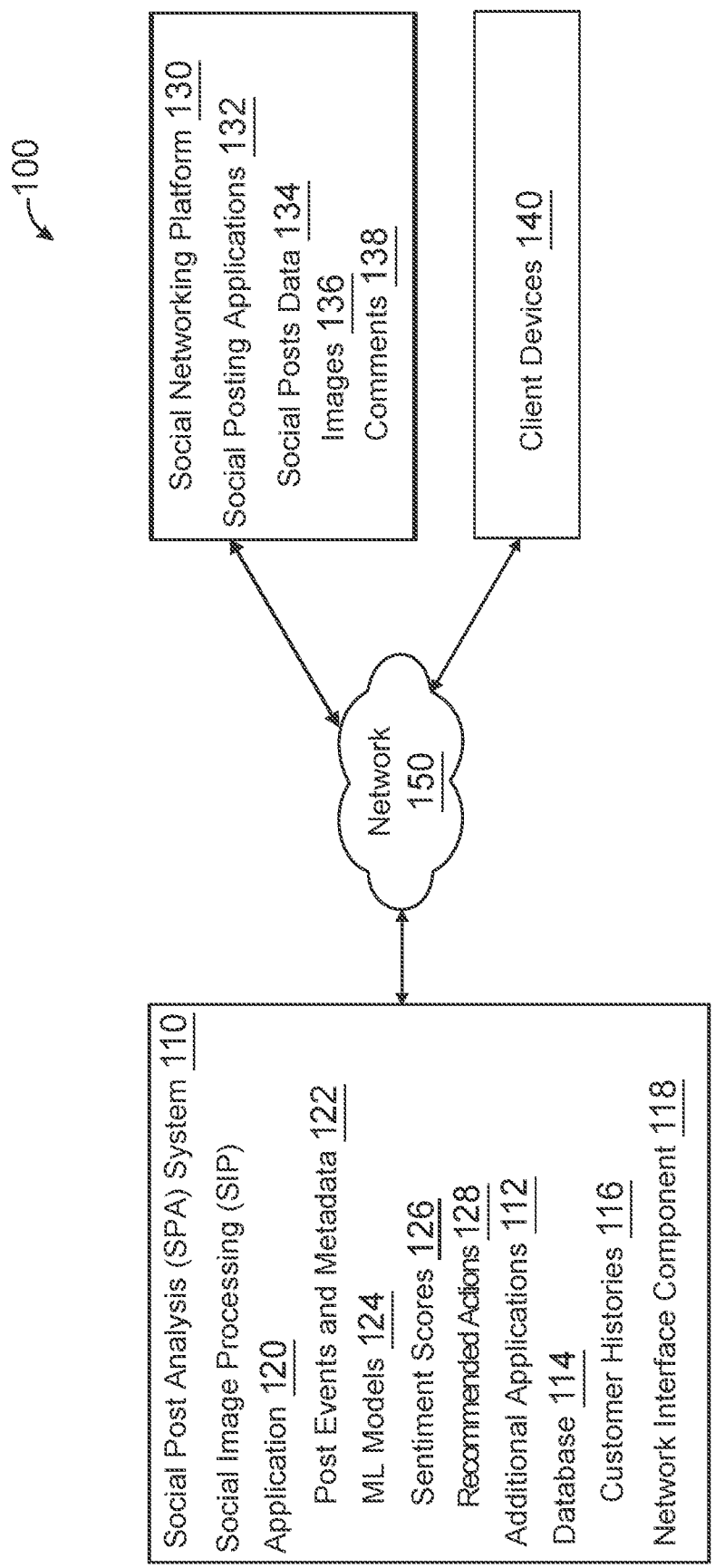
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to provide for sentiment analysis and prediction in social media posts having images and/or text content using one or more ML models of an ML engine, the ML model(s) may be trained and utilized for decision-making and sentiment prediction as discussed herein. ML models may be built on different tenants of a CRM and/or ML model training system, such as different customer users and/or entities (e.g., businesses, companies, and other organizations). A current model may be trained on historical data to perform sentiment analysis from images and/or text for one or more tenants, customers, agents, employees, consumers, or other users, including those that may interact with a tenant. In particular, the model may be trained based on real social media posts of customers for a service provider and/or tenant entity utilizing computing services of the service provider. The model may be an ML, NN, and/or other AI-based model and corresponding training or execution algorithm, logic, and/or code. For example, a NN model may provide, as output, a score or other predictor classification for an input image and/or text from a social media post. The NN model may be trained in order to mimic human thinking, decision-making, sentiments, and the like so that predictions of a customer's experience and/or engagement with a merchant, service provider, or other tenant may be provided with increased accuracy.

Conventionally, automated processes may have difficulty when understanding subtleties and idiosyncrasies of language, including slang, sarcasm, jokes, regional dialects, and the like. Further, automated processed may miss neutral sentiments, as well as not appropriately consider a social media post's image, text, and/or metadata that may provide additional context for proper sentiment analysis. Where parts of posts are individually processed, not all data may be considered or combined properly. Further, for human or live agents, reviewers, and/or managers that may be involved in social media post review and analytics, time and speed for post review may be hindered or made impossible due to the amount of data to evaluate. Thus, this approach may not be efficient and may perform poorly on more recent data and/or large data sets. To increase performance and catch particular user sentiments, the model may be trained using social media post data. More efficient and timely sentiment analysis from images and other data in social media posts may be determined as discussed herein.

Initially, an ML model may be trained using historical social media post data, and/or may be further trained, updated, and/or implemented with continuous learning. The model may then be deployed into a production environment, where new inquiries are received, and labels are predicted by the ML model. The NN or other ML/AI-based model may be trained based on real social media posts collected from customers. The algorithm for the model may then predict and provide a generic recommendation or tailor-made recommendation based on image sentiments that can expand on previous models and/or be run and executed as a standalone model. The recommendations may be provided to a DCM managing one or more channels, customers, tenants, or the like. Thus, the recommendation may be based on historical information on other channels (e.g., a particular social media or networking platform and/or communication pathway or protocol, such as online posts, forum posts, public or private messages, etc. that might exist in customer data from audio and/or video interactions and the like). Widgets may be provided to the DCM, agents, and/or consumers for review. These operations may be used to provide a DCM with image analysis for new digital channels, automated chatbot image analysis, real-time image analysis during voice and/or video calls and communications, or the like, or a combination thereof.

The solution disclosed herein therefore provides a DCM with a real-time scan and sentiment analysis of image and other social media posts to provide recommendations on the best course of action for the DCM to take with a customer and/or an entity responsive to their post and/or other posts with the same or similar sentiment for an event, interaction, object, tenant, or other identified subject of the posts. The sentiment and digital channel data may be sent for performance management to monitor a customer journey experience. The combination of text analytics with image analysis may create a complete overview of all social media posts so that the DCM may no longer need to manually track and analyze image posts. Moreover, the solution may provide the DCM with the ability to quickly respond to any kind of sentiment by using the recommendation option provided as output based on the combined scores and identified actions to take. The data and sentiment may provide the DCM with the full visibility of the customers digital experience, as well as increase an entity's social media presence and engagement virtually by elevating positive sentiment posts and reducing or eliminating friction created by negative sentiment.

The embodiments described herein provide methods, computer program products, and computer database systems for an ML system for detecting and processing social media posts using ML models and the like for recommended actions. A service provider system may therefore include a sentiment analysis system for tenant customers, users, and/or entities that may access different ML models to score sentiments for images and/or text and provide recommended actions. Once ML models are generated and updated as described herein, the ML models may be deployed for intelligent image and social media post analysis and classification, as well as other predictive analytic systems.

According to some embodiments, in an ML system accessible by a plurality of separate and distinct organizations, ML algorithms, features, and models are provided for identifying, predicting, and classifying image and other social media post sentiment automatically and accurately, thereby providing faster and more precise predictive analysis by ML systems.

Example Environment

The system and methods of the present disclosure can include, incorporate, or operate in conjunction with or in the environment of an ML engine, model, and intelligent system, which may include an ML or other AI computing architecture that includes a sentiment analysis system. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, ML, neural network (NN), and other AI architectures have been developed to improve predictive analysis and classifications by systems in a manner similar to human decision-making, which increases efficiency and speed in performing predictive analysis of transaction data sets. One or more devices and/or servers may be operated and/or maintained by the same or different entities.

FIG. 1 illustrates a block diagram of an example environment 100 according to some embodiments. Environment 100 may include a social post analysis (SPA) system 110, a social networking platform 130, and client devices 140 that interact to provide intelligent sentiment analysis, scoring, and other predictive decision-making through online training of one or more ML models that utilize image and text sentiment analysis for output of recommended actions as discussed herein. In other embodiments, environment 100 may not have all of the components listed and/or may have other elements instead of, or in addition to, those listed above. In some embodiments, the environment 100 is an environment in which social media posts processing, sentiment analysis, and action recommendation may be performed through an ML or other AI system. As illustrated in FIG. 1, SPA system 110 might interact via a network 150 with social networking platform 130 and client devices 140, which generates, provides, and outputs social media posts, comments, metadata, and other information used for classifications in ML models during of sentiment scores, polarity, positive or negative correlation, and the like.

SPA system 110 may train and/or deploy NNs and other ML models for sentiment analysis and scoring. For example, social image processing (SIP) application 120 may be provided for use by and/or with social posting applications 132 of social networking platform 130. For example, SIP application 120 may obtain post events and metadata 122 in order to train ML models 124. Post events and metadata 122 may correspond to social media posts and other social networking performed by client devices 140 with social networking platform 130 and/or other social media, posting, and/or networking services. For example, post events and metadata 122 may include social posts data 134 from social posting applications 132, including images 136, comments 138, and/or other data and metadata for training of ML models 124.

Thus, SIP application 120 may further include ML models 124 trained and/or adjusted for deployment in a production computing environment using past training data and ML training operations. The past training data may be associated with past social media and networking posts that may include images, text, graphics or emojis, animations (e.g., GIFs), and the like, which may have a corresponding sentiment. The training data may be labeled or unlabeled for different supervised or unsupervised ML and NN training algorithms, techniques, and/or systems. SPA system 110 may further provide sentiment scores 126. For example, initially ML models 124 may be trained on social posts data 134, as well as customer histories 116 from database 114. Social posts data 134 may include historical social media posts, images 136, text in a title or post body associated with images 136 and/or comments 138, and other data used to provide a basis for training data used to train ML models 124. This may include identifying variables for features, performing feature engineering and/or selection of features associated with these variables used by ML models 124, and using one or more ML algorithms, operations, or the like (e.g., including configuring decision trees, weights, activation functions, input/hidden/output layers, and the like). After initial training, ML models 124 may be deployed in a production computing environment to receive inquires and data for features and predict labels or other classifiers from the data (e.g., sentiment scores and/or sentiment analysis, such as positive, neutral, or negative sentiment, from social media posts including images, text, and other data).

During training of ML models 124, data may be preprocessed and output into a matrix of pixels and/or other data representations (e.g., of images), that may be used for converting an image or other image to a matrix or other data representation that may be processed at an input layer, node, or component of a NN, ML model, or the like. Each matrix cell for a pixel or other data may include an integer number or n-dimension representation of the data. This may allow for representation of data as n-dimensional vectors and/or matrices, as well as calculation of such vectors or other data representations from matrices. A NN or other ML-based model may then be trained using a function and/or algorithm for the model trainer, as well as other AI systems, trainers, and operations for model and/or engine training and development. The training may include adjustment of weights, activation functions, node values, and the like. A Rectified Linear Unit (ReLU) function may be used in layers of the NN or other ML model. The ReLU functions and layers may take an image pixel matrix as input and output, such as through a sigmoid function in a later layer, a sentiment score, value, or decision. The value returned may indicate an extent, degree, or factor of the polarity (e.g., positive or negative) of the corresponding output or sentiment (e.g., a score between 0 to 1, with both extremes correspond to a maximum polarity). Binary cross entropy may be used for the loss function and the model may be tested after training. A metadata aggregator for metadata of images and social media posts, as well as text sentiment analysis, may be used for identifying the overall sentiment in the social media post and/or normalizing a sentiment score for the sentiment.

After training and deployment of ML models 124 by SIP applications 120, one or more operations of SIP application 120 may utilize sentiment scores 126 with the post metadata from the metadata aggregator to generate a recommendation list. For example, sentiment scores 126 may be used when processing additional social media posts from social posts data 134 for identification of sentiments associated with an event or object (e.g., item, user, service entity, merchant, location, etc.) from the social media posts. Customer histories 116 may be used with the identified sentiments and posts, which may be processed and compared to a threshold number of posts and/or negative sentiments to determine whether there is a specific bad experience. Out of the box (OOTB) solutions may be provided, such as when the negative sentiments may not indicate an overall bad experience, an experience not exceeding a threshold for identification of a particular sentiment, or of a neutral or other sentiment polarity. Using sentiment scores 126 with metadata and other information, recommended actions 128 may be determined. Recommended actions 128 may include actions to respond to a post and/or provide a comment, as well as actions to provide an additional social media post or communication to the customer, another associated customer or entity, and/or a public audience (e.g., available customers that may have or could have the same negative experience). Recommended actions 128 may also include one or more of providing additional computing services, identifying strategies or actions to assist with a good or bad experience and increase customer satisfaction and engagement, and/or recommending investigation into computing issues, downtime or interruption of service, fraud or risk, computing system attacks and vulnerabilities, poor customer service and/or experience issues, or the like. Thus, the social media post analytics, sentiment analysis for sentiment scores 126, and/or recommended actions 128 may be used with additional applications 112 to provide computing services, offers, and/or other engagements with customers and other users.

One or more client devices and/or servers may execute a web-based client that accesses a web-based application provided by SPA system 110, or may utilize a rich client, such as a dedicated resident application, to access SPA system 110, which may be provided by additional applications 112 and/or including computing services, platforms, interfaces, and data processing operations to client devices 140. Client devices 140 may utilize one or more application programming interfaces (APIs) to access and interface with additional applications 112 and/or SIP application 120 of SPA system 110 in order to engage in computing services, where actions may be recommended and performed based on social media posts by client devices 140 with social networking platform 130, as discussed herein. Interfacing with SPA system 110 and/or social networking platform 130 may be provided through an application for additional applications 112 and/or SIP application 120 and may be based on data stored by database 114 of SPA system 110, social networking platform 130, and/or client devices 140. Client devices 140 might communicate with SPA system 110 and/or social networking platform 130 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between SPA system 110, social networking platform 130, and/or client devices 140 may occur over network 150 using a network interface component of the client devices and a network interface component of SPA system 110. In an example where HTTP/HTTPS is used, the client devices might include an HTTP/HTTPS client commonly referred to as a "browser" for sending and receiving HTTP//HTTPS messages to and from an HTTP//HTTPS server, such as SPA system 110 via the network interface component.

SPA system 110 may host an online platform accessible over network 150 that communicates information to and receives information from social networking platform 130 and/or client devices 140. Such an HTTP/HTTPS server might be implemented as the sole network interface between social networking platform 130 or client devices 140 and SPA system 110, but other techniques might be used as well or instead. In some implementations, the interface between social networking platform 130 or client devices 140 and SPA system 110 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

The devices, servers, and/or components in environment 100 may utilize network 150 to communicate, such as between with SPA system 110, social networking platform 130, and/or client devices 140, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. The most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol. Further, one or more of SPA system 110, social networking platform 130, and/or client devices 140 may be included by the same system, server, and/or device and therefore communicate directly or over an internal network.

According to one embodiment, SPA system 110 and/or social networking platform 130 is/are configured to provide webpages, forms, applications, data, and media content to one or more client devices and/or to receive data from the client device(s). In some embodiments, SPA system 110 and/or social networking platform 130 may be provided or implemented in a cloud environment, which may be accessible through one or more APIs with or without a correspond graphical user interface (GUI) output. SPA system 110 and/or social networking platform 130 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, SPA system 110, social networking platform 130, and client devices 140, shown in FIG. 1, execute processing logic with processing components to provide data used for SIP application 120 and/or ML models 124 and/or utilize SIP application 120 and/or ML models 124 of SPA system 110. In some embodiments, this may include providing social posts data 134, customer histories 116, and/or other images, metadata, and the like that may be processed for ML model training and/or sentiment analysis and action recommendation. In one embodiment, social networking platform 130 and/or client devices 140 include application servers configured to implement and execute software applications, as well as provide related data, code, forms, webpages, platform components or restrictions, and other information associated with social media posting and provision of social media data (e.g., images, text, and the like) for sentiment analysis. SPA system 110 may implement various functions of processing logic and processing components, and the processing space for executing system processes, such as running applications for ML modeling and/or sentiment analysis for trends and/or engagement with various events and objects. Social networking platform 130 and client devices 140 may be accessible over network 150. Thus, SPA system 110 may send and receive data to one or more of social networking platform 130 and client devices 140 via network interface components. Social networking platform 130 and client devices 140 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

The system shown and described in FIG. 1 includes elements that are explained briefly here. For example, client devices 140 may include a desktop personal computer, workstation, laptop, notepad computer, PDA, cell phone, or any wireless access protocol (WAP) enabled device or any other computing device capable of interfacing directly or indirectly to the Internet or other network connection. Client devices 140 may also be a server or other online processing entity that provides functionalities and processing to other client devices or programs, such as online processing entities that provide services to a plurality of disparate clients.

Client devices 140 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, client devices 140 and all of the components thereof are configurable using applications, such as a browser, including computer code run using a central processing unit such as an Intel Pentium® processor or the like. However, client devices 140 may instead correspond to a server configured to communicate with one or more client programs or devices, similar to a server corresponding to SPA system 110 that provides one or more APIs for interaction with the client devices in order to submit data sets, select data sets, and perform modeling operations for an ML system configured for sentiment analysis of images and other data in social media posts.

Thus, SPA system 110, social networking platform 130, and/or client devices 140 (as well as any client devices) and all of their components might be operator configurable using application(s) including computer code to run using a central processing unit, which may include an Intel Pentium® processor or the like, and/or multiple processor units. A server for SPA system 110, social networking platform 130, and/or client devices 140 may correspond to Window®, Linux®, or the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring SPA system 110, social networking platform 130, and client devices 140 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

ML Model Training, Features, Classifications, and Sentiment Analysis

Figure 2:
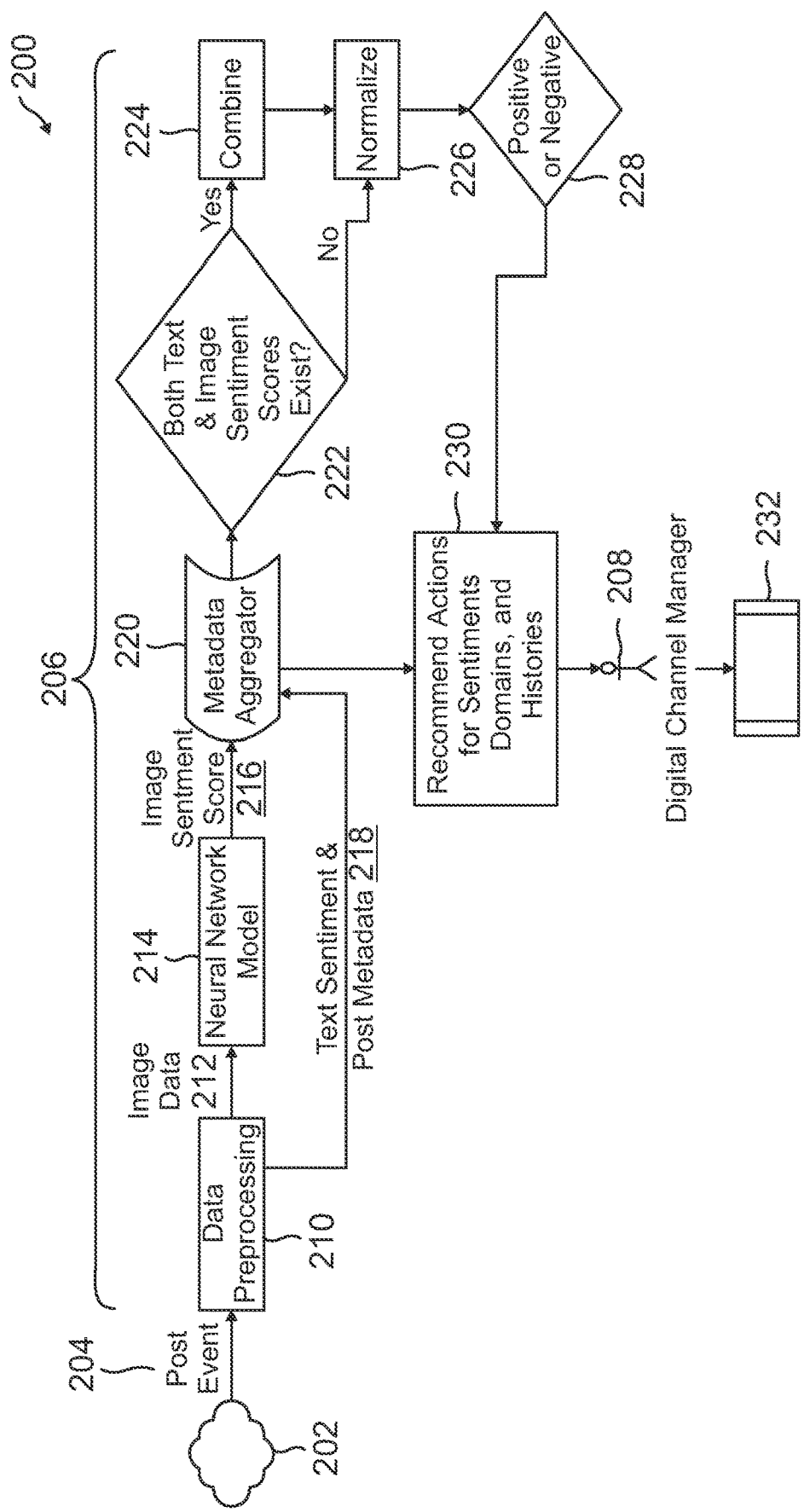
FIG. 2 is a simplified system environment for analyzing a social media post using an ML model to output sentiment scores and determine recommended actions according to some embodiments.

FIG. 2 is a simplified system environment 200 for analyzing a social media post using an ML model to output sentiment scores and determine recommended actions according to some embodiments. In this regard, system environment 200 shows initial training of an ML model on and/or using historical data for social media posts having images for sentiment determination, deployment in an online production computing device of the ML model, and sentiment analysis for action recommendation. In this regard, system environment 200 displays components that may be used for these operations, such as those for use with ML models 124 of SIP application 120 for SPA system 110 from environment 100 of FIG. 1.

A client device, customer, and/or other end user or client may interact with a social media and/or networking platform to post social data including images and/or text, such as a social networking platform 202. Social networking platform 202 may interact with the components of image analysis and sentiment detection for a service provider that are shown in system environment 200. Initially, the service provider may establish and train an ML model based on historical data and other training data for social media posts, images, and sentiments, which may correspond to static past data and/or initially fed labeled or unlabeled data. The NN or other ML-based model may be trained for a live deployment computing environment where decision-making, adjudication, and other outputs of the ML model may be provided and output for sentiment analysis. For example, after a post event 204 is detected, sentiment analysis and action recommendation components 206 may be utilized to provide a sentiment analysis and/or recommended action to DCM 208.

During training, features considered for model inclusion may be determined, such as those features available to an ML platform's decision processes at a time of execution (e.g., available to an ML model trainer and/or decision platform of a service provider). This may include a variety of features representing, such as by numerical, alphanumerical, and/or symbol representation (including those in matrices, vectors, etc.), the image, text, social media post, users and/or commenters, metadata, and the like. Data enrichment may occur during preprocessing of data sets to obtain additional information in the training and/or testing data sets. During ML model training and testing, the data set may be split into a training data set and a testing data set, and additional sampling and/or data bagging may occur. Data bagging may occur by taking a relative sample size of all features for the ML model and training/testing multiple ML models, each configured with the corresponding features. Thereafter, a combination of the different ML models or a best performing model may be selected for use, deployment, and decision-making in a production computing environment performing sentiment analysis of social media posts. Sampling may also or instead be performed to reduce system bias with uneven data sets. During training and testing, the data points in each data set for training and testing may be excluded for each other to check accuracies and precisions by the ML model. The data points in the training data set may chronologically occur before the data points in each of the test data sets.

Further, data preprocessing 210 may include steps that may be required during training and/or data analysis, which may include data cleaning, sampling, normalizing, determining intersecting columns between data sets, and feature engineering. In this regard, an image post to a social media and/or networking platform, account, data feed, forum, or the like may be processed to output a matrix for the pixels and other data that represents the image. During data preprocessing 210, the image pixels may be read and verified that the image is in proper direction or requires rotation to have all the same or similar images be properly aligned. The image pixels may then be read and a matrix of x, y size (width x by height y) may be generated. The image may be resized to a common image size that is held in the database, such as a default of 150×150 and 3 channels for a red-green-blue color format. The matrix may therefore correspond to 150×150×3 dimensions after transforming, where each matrix cell includes an integer number or the like that represents pixel data, output, or the like.

Model training may then be performed using features determined from feature engineering. Feature engineering may be performed by using domain knowledge to extract features from raw data (e.g., variables) in the training data set. For example, data features may be transformed from specific variables and features may be based on business logic and/or may be selected by a data scientist or feature engineer. During feature engineering, features may be identified and/or selected based on historically aggregated data for observations, sentiments, social media posts, and the like. Thereafter, a train and test flow may be used to the NN or other ML model training.

One or more ML models may be trained for those features to provide an output classifier, such as a classification of polarity for a sentiment (e.g., positive or negative, as well as a quantification or prediction confidence). ML models may include different layers, such as an input layer, one or more hidden layers, and an output layer, each having one or more nodes, however, different layers may also be utilized. For example, ML models may include as many hidden layers between an input and output layer as necessary or appropriate. Nodes in each layer may be connected to nodes in an adjacent layer. In this example, ML models receive a set of input values or features and produce one or more output values. However, different and/or more outputs may also be provided based on the training. When ML models are used, each node in the input layer may correspond to a distinct attribute or input data type derived from the training data.

In some embodiments, each of the nodes in a hidden layer, when present, generates a representation, which may include a mathematical computation (or algorithm) that produces a value based on the input values of the input nodes. The mathematical computation may include assigning different weights to each of the data values received from the input nodes. The hidden layer nodes may include one or more different algorithms and/or different weights assigned to the input data and may therefore produce a different value based on the input values. The values generated by the hidden layer nodes may be used by the output layer node to produce an output value. When an ML model is used, a classification, score, or prediction may be output from the features. ML models may be separately trained using training data from data bagging, as well as tested and/or updated using data bagged sets for features, where the nodes in the hidden layer may be trained (adjusted) such that an optimal output (e.g., a classification) is produced in the output layer based on the training data. By continuously providing different sets of training data and penalizing ML models when the output is incorrect, ML models (and specifically, the representations of the nodes in the hidden layer) may be trained (adjusted) to improve performance of the models in data classification. Adjusting ML models may include separately adjusting the weights associated with each node in the hidden layer, as well as activation functions of node importance and/or data throughput to a further node.

For example, during NN model training, convolution layers or the like of convolution neural networks (CNNs) may be used as a class of artificial NNs that may be used to process images and pixels of images from matrices generated as discussed herein. The NN may include one or more CNN layers or functions. In some embodiments, ReLU functions may be used by the NN with a sigmoid function that determines the output, such as positive or negative sentiment and/or a degree or quantification of that polarity. Calculation of ReLU from convolution layers or other NN layers with sigmoid functions may be performed using the following from Equations 1:

$$ReLU: f(x) = \max(0, x) \qquad \text{Equations 1}$$

If the function receives a negative input, it returns 0; however, if the function receives a positive value x, it returns that value. As a result, the output has a range of 0 to infinite.

Sigmoid function at the output of the NN or other ML model:

$$S(x) = \frac{1}{1+e^{-x}} = \frac{e^x}{e^x+1} = 1 - S(-x).$$

Thus, the NN or other ML model may include an input layer, one or more convolution or other hidden node layers, pooling layers or operations, dropout and/or flatten layers, as well as dense NN layers for an output of the model. After activation of the dense layer(s), the sigmoid function may be activated to provide the corresponding output. During the training flow of a NN or other ML model for sentiment classification from images and/or social media posts, the training flow may be done offline, and the model may be trained on data with labels (or without, for certain training operations and algorithms) that is collected and preprocessed from customer and/or public data sets of images and/or social media posts.

Each image with the relevant label may be read, such as a table of two columns (file name/path, image label). The label may be 0 or 1 corresponding to a negative or positive image sentiment polarity, which is the label for image sentiment classification of the corresponding image. This read operation may be the output of the training data preprocessing. Thereafter, the output may be a file containing the model and the model's learned weights and architecture (e.g., nodes, layers, connections, etc.). The model may attempt to obtain a loss function value that is as small as possible when reading each sample and running each interaction. In this regard, the loss function may be binary cross entropy that compares each predicted probability to actual class outputs, which can be either 0 or 1. A score is then calculated that penalizes the probabilities based on the distance from the expected value. For example, binary cross entropy may be a negative average of the log of corrected predicted probabilities. Calculation of binary cross entropy may be performed using the following from Equation 2:

$$-\frac{1}{N}\sum_{i=1}^{N} y_i \log(S(f(x_i))) + (1 - y_i)\log(1 - S(f(x_i))) \quad \text{Equation 2}$$

The test flow may load the corresponding model's file from the training and use image pixel representations as the input to predict a corresponding label (e.g., 0 or 1 for negative or positive, respectively, sentiment). During testing, configuration and adjustment of the model may be performed based on model accuracy and outputs. Further, model explanations may be performed to understand the importance of features in each model and the importance of the features to the models. Thus, after building the models, an ML model explainer, such as an explanation algorithm, may be used to verify the added value of each separate feature. Metadata may be aggregated from sources that may be provided to a recommendation system in addition to image sentiment scores from the trained and tested model. A metadata aggregator may be used to combine the metadata for the image, social media post, and/or recommendation information with an image and/or text sentiment score. The image and/or text sentiment scores may be combined and/or normalized. A sentiment score structure may include a key value string, a key for an image identifier, and/or a value for the sentiment (which may be a probability, such as a 0.66 or 66% probability that an image is a positive sentiment). If binary values are used for sentiments, a threshold may be assigned between 0 and 1. For example, a symmetric threshold of 0.5 may be used to assign 0.66 to a 1—positive sentiment and otherwise set the output sentiments as a binary value.

Thus, after model training, during use of the NN or other ML model for image sentiment analysis in social media posts the ML model may be invoked after data preprocessing 210 on image data 212. Image data 212 may include corresponding input data for features of the ML model that is taken at an input layer to output a classification at an output layer based on hidden layers of the model. NN model 214 may output an image sentiment score 216 with text sentiment and post metadata 218 to a metadata aggregator 220. Text sentiments may be retrieved and/or determined from metadata or may be determined from an output of a text sentiment analysis model, engine, and/or operations of the service provider. Metadata structures may correspond to key value pairs based on available metadata. In some embodiments, containers and/or structures for metadata and/or key value pairs may be in JavaScript Object Notation (JSON) with a type string for the key value pairs. Most key value pairs may not be necessary or used, however, common key values from digital channels may include message content (e.g., text, text type, payload, etc.), a create date or post date of a post, an author end user identity (e.g., identifier within or on a social media platform, name, nickname, username, image, etc.), and/or attachments to the post (e.g., identifier, type of attachment, URL or URI of the data, a sentiment value of text in the post, comments and/or their text sentiment values, etc.).

If at a decision 222, both text and image sentiment scores exist, combination operations 224 may be performed with normalization operations 226 for output of a single sentiment score. Text probability for a sentiment and image probability for a sentiment may be normalized and/or a higher of the two scores or probabilities may be selected for sentiment determination (e.g., as 0 or 1 for negative or positive). For example, the relevant probability of each text or image sentiment may be normalized to one score if needed or if desired, which may include using a same, similar, or different weight to each type of sentiment score (e.g., text or image sentiment score). Each score's probability of text and image sentiment may also be normalized between 0 to 1 (when 1 means 100% positive or the like) prior to or during combination operations 224. Thereafter, one sentiment score may be output after normalization operations 226 for use with metadata aggregation and action recommendation for the social media.

However, if metadata aggregator 220 includes image sentiment score 216 alone or as the sentiment utilized for action recommendation, after decision 222 the system or process may proceed directly to normalization operations 226 for determination of a positive or negative sentiment 228. Based on positive or negative sentiment 228, action recommendation operations 230 may be implemented to provide a recommended action to a DCM 208, which may take, process, or provide an action 232 for use with a customer, entity, social media platform, social media post, image, or the like.

In some embodiments, data may be provided to action recommendation operations 230 directly from metadata aggregator 220, where the recommended action may be determined based on the post sentiment, domain, and/or customer history. Similarly, DCM 208 may receive the recommendation and take, process, or provide action 232 for use with a customer, entity, social media platform, social media post, image, or the like. Recommended actions to be taken based on the score(s) and metadata are discussed in further detail with regard to FIG. 3.

Figure 3:
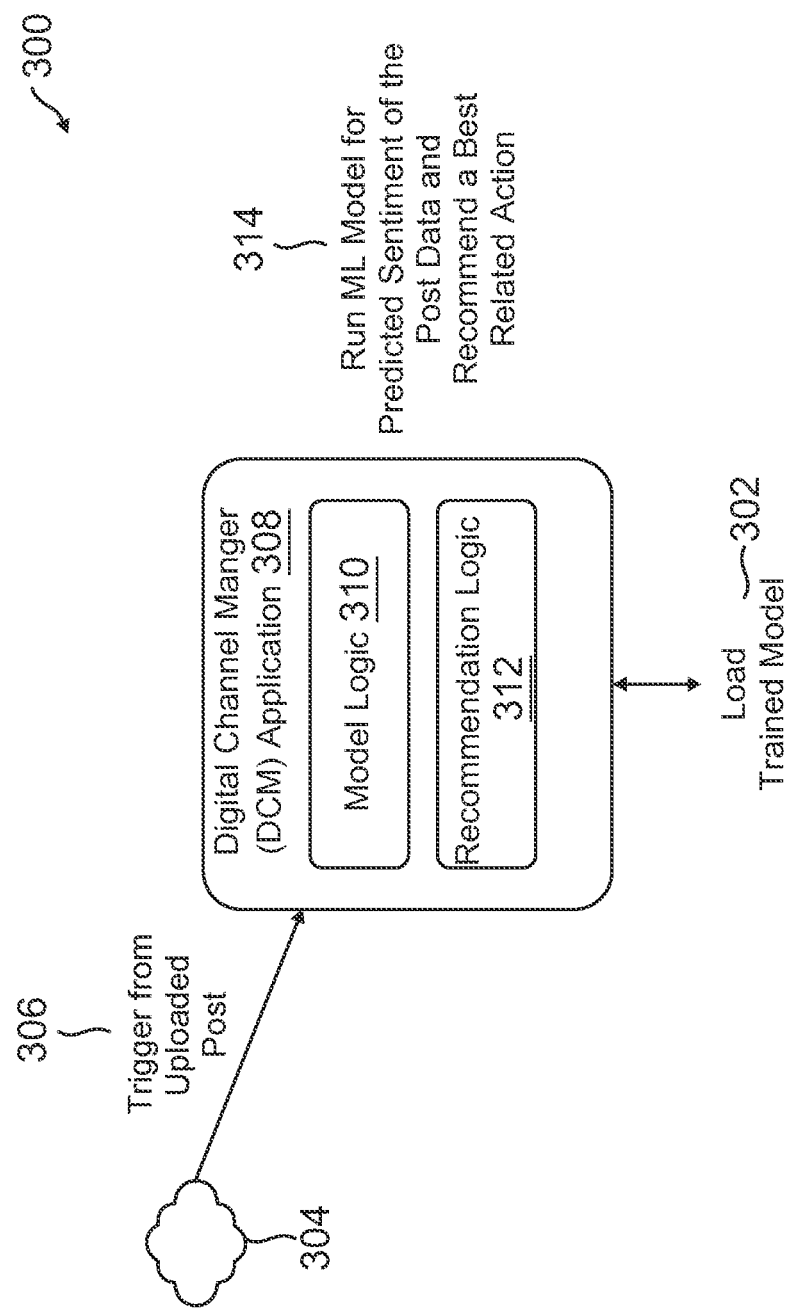
FIG. 3 is a simplified block diagram of a module that may be triggered to analyze social media posts using a trained ML model according to some embodiments.

FIG. 3 is a simplified block diagram 300 of a module that may be triggered to analyze social media posts using a trained ML model according to some embodiments. In this regard, diagram 300 in FIG. 3 shows outputs from a trained ML model, such as the recommendations based on sentiment analysis by the ML model in system environment 200 of FIG. 2. After training and model deployment, diagram 300 may include execution of the ML model and corresponding engine, such as use of a NN for predicting sentiments that may be used to recommend a related action. In this regard, diagram 300 includes components for sentiment analysis, such as those for use with ML models 124 of SIP application 120 for SPA system 110 from environment 100 of FIG. 1.

Initially, at an event 302, a trained model is loaded, such as the model trained as discussed with regard to system environment 200 of FIG. 2. The trained model may therefore be trained on social media posts and images, which may be used to classify a post and/or corresponding image as having positive or negative sentiment by a customer or other user. A social networking platform 304, such as a social media posting service, may initially have an uploaded post event 306 that triggers a DCM application 308, which may correspond to SIP application 120 and/or a sub-application or component of SIP application 120 utilizing the trained NN model (or other ML/AI model) for sentiment analysis. DCM application 308 includes loaded model logic 310 for the ML model and loaded recommendation logic 312 for outputting recommended actions to DCMs, customers, entities, or the like.

For example, one sentiment score, which may be determined after combining and normalizing different image and/or text scores as discussed in FIG. 2, may be determined by model logic 310. Model logic 310 may include the logic and/or code for model architecture, layers, nodes, weights, values, activation functions, pathways and/or pathway weights, and the like of the trained NN or similar model. Recommendation logic 312 may include logic and code to output recommendations of actions to take based on sentiments, posts, or the like, which may consider metadata, domain, social platform, or the like. Thus, post sentiment and post metadata may be provided to a collection metadata with a customer history from a data repository. The collection metadata may include or correspond to a created dictionary having metadata that is entered to recommendation logic 312 with the social media post's sentiments. The collection metadata system and operations may obtain any available sentiment scores and calculate a bad experience measurement, where a call to the repository may filter customer data and join data based on relevant indicators.

When determining whether posts and/or interactions indicate an overall bad experience by the customer and/or other customers, a plurality of negative sentiments and social media posts may be required. For example, a bad experience measurement may be calculated by dividing a total number of negative sentiments by a selected amount or value that may be based on a number of interactions related to the customer over a time period. This may include those interaction having or exceeding an average handle time per the time period (e.g., five working days in a week, which would normally have five interactions of average handle time in that time period). In an example, a user may have interactions over a week with negative sentiment as determined from social media posts and selected or all communication and/or social media channels. If the user further has one hundred calls above the average handle time (e.g., five minutes), these numbers may be combined or added together and divided by the number of interactions (e.g., five working days available over the week). This would result in 21 (e.g., (5+100)/5) and compared to a threshold (e.g., 10). If under the threshold, no action may be executed, and the process may repeat and/or continue monitoring for social media posts. Further, if a good experience is identified, actions may be recommended to increase customer engagement and/or provided benefits to customers and/or entities by DCMs.

However, if over the threshold, the customer may be identified as having a bad experience, where a recommended action may be provided to rectify or repair the bad experience and increase customer satisfaction and engagement. Output 314 may include a recommendation event or notification for one or more recommended actions, such as customer outreach, benefit conveyance, social media posting and/or responses, commentary for social media posts, and the like. These recommendations may be based on the image/text sentiment and/or combination of the sentiments, a domain of the social media posts (e.g., online location, platform, entity, company, customer, or the like), an image and/or customer history, interaction quality, and the like. For example, recommended options and/or actions may include a communication outreach to a customer, as well as engagement directly and/or through social networking. In this regard, recommended actions are shown with corresponding social media posts in further detail with regard to FIGS. 4A-4B.

Figure 4A:
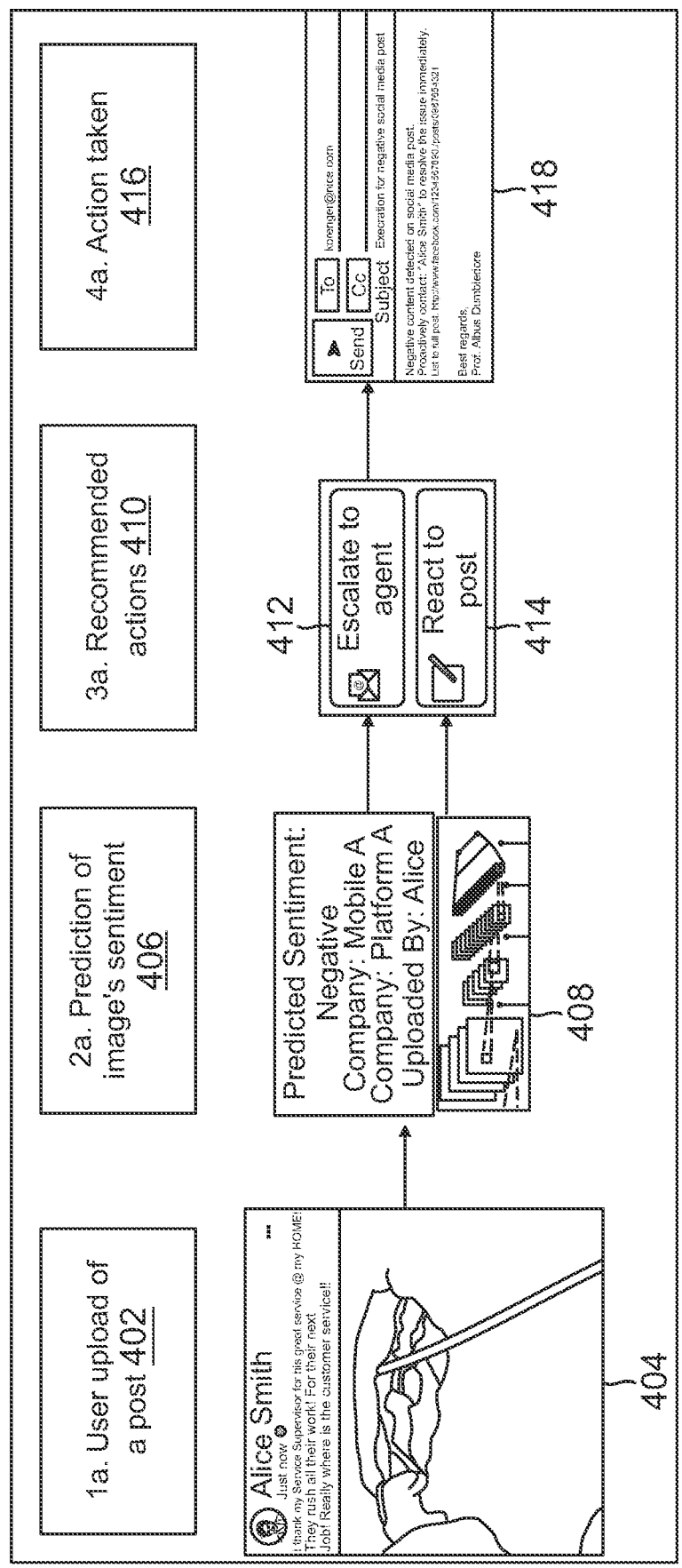
FIGS. 4A-4B are simplified environments showing social media posts that may be analyzed for predicted sentiments and recommended actions using ML models according to some embodiments.
Figure 4B:
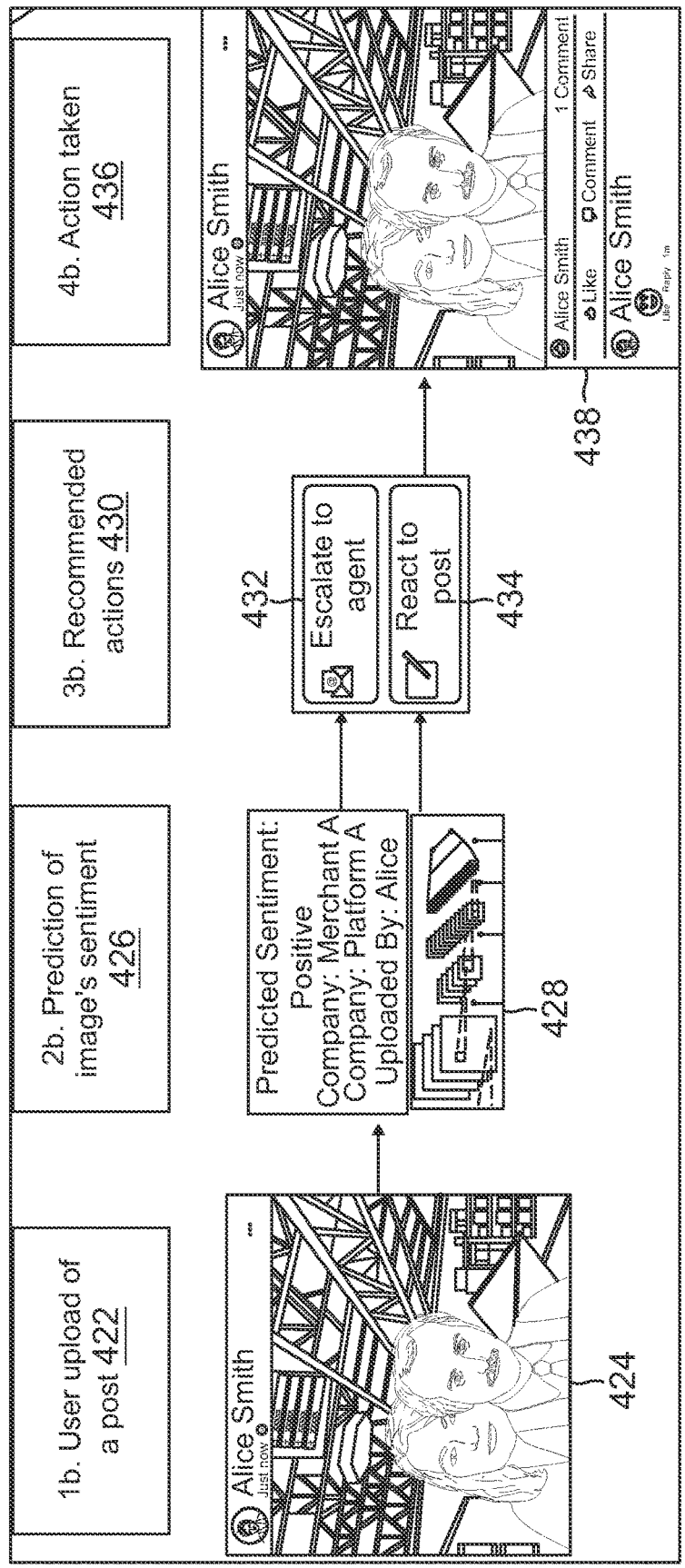

FIGS. 4A-4B are simplified diagrams 400a-400b showing social media posts that may be analyzed for predicted sentiments and recommended actions using ML models according to some embodiments. In diagram 200a, a user may have a negative experience and post to social media and/or networking platforms, feeds, and systems, whereas in diagram 200b, a user may have a positive experience and similarly post in response to that experience.

In this regard as to the present embodiment, diagram 400a shows an initial event where an uploaded post 402 is provided and shown in social media post 404. Social media post 404 includes an image, as well as text that describes the problem, negative sentiment, and/or bad or poor experience with another user, entity, service provider, or the like. A NN or another ML model may be loaded and run so that a model prediction 406 may be determined. Model prediction 406 may be based on trained layers and/or components of the NN or other ML model with model features for the image. Additional data or metadata, such as company name or identifier, social media or communication channel, uploader, image, text, metadata, and/or other information, may also be used. Thus, predicted sentiment 408 shows a negative sentiment assessed by the model.

Diagram 400a then proceeds to recommended actions 410, which may include escalating the issue to an agent and/or reacting to a post. For example, escalate option 412 may provide an agent with data to contact the customer and inquire about options or outreach that may rehabilitate the damaged relationship or assist in fixing the negative experience. React option 414 may allow the DCM to react to the social media post in order to obtain more information, issue apologies, or provide an incentive or compensation for the negative experience. A DCM may receive recommended actions 410, and may perform a taken action 416, such as an outreach by the DCM or an agent to the corresponding user in response to selecting escalate option 412 and shown in outreach recommendation 418. Conversely, in diagram 400b, a positive experience is reported and/or posted from an uploaded post 422 shown in social media post 424. This may include an image and text data, where the text data may include other information and/or metadata such as a location, username or identifier, or the like.

A model prediction 426 may be determined using the image data, which may be preprocessed and/or converted to matrix or vector form, for predicted sentiment 428. Additional data and/or metadata shown for predicted sentiment 428 may include a company identifier, communication channel, and uploader identifier with the image. Recommended actions 430 may similarly include an escalate option 432 and a react option 434. However, in diagram 400b, react option 434 is selected. Thus, during a taken action 436, a respond or comment to the social media post is seen in a social media response 438. This may be in response to the positive sentiment, and therefore the recommendation of the action may allow the DCM or other agent to respond to the social media post and increase customer engagement.

Figure 5:
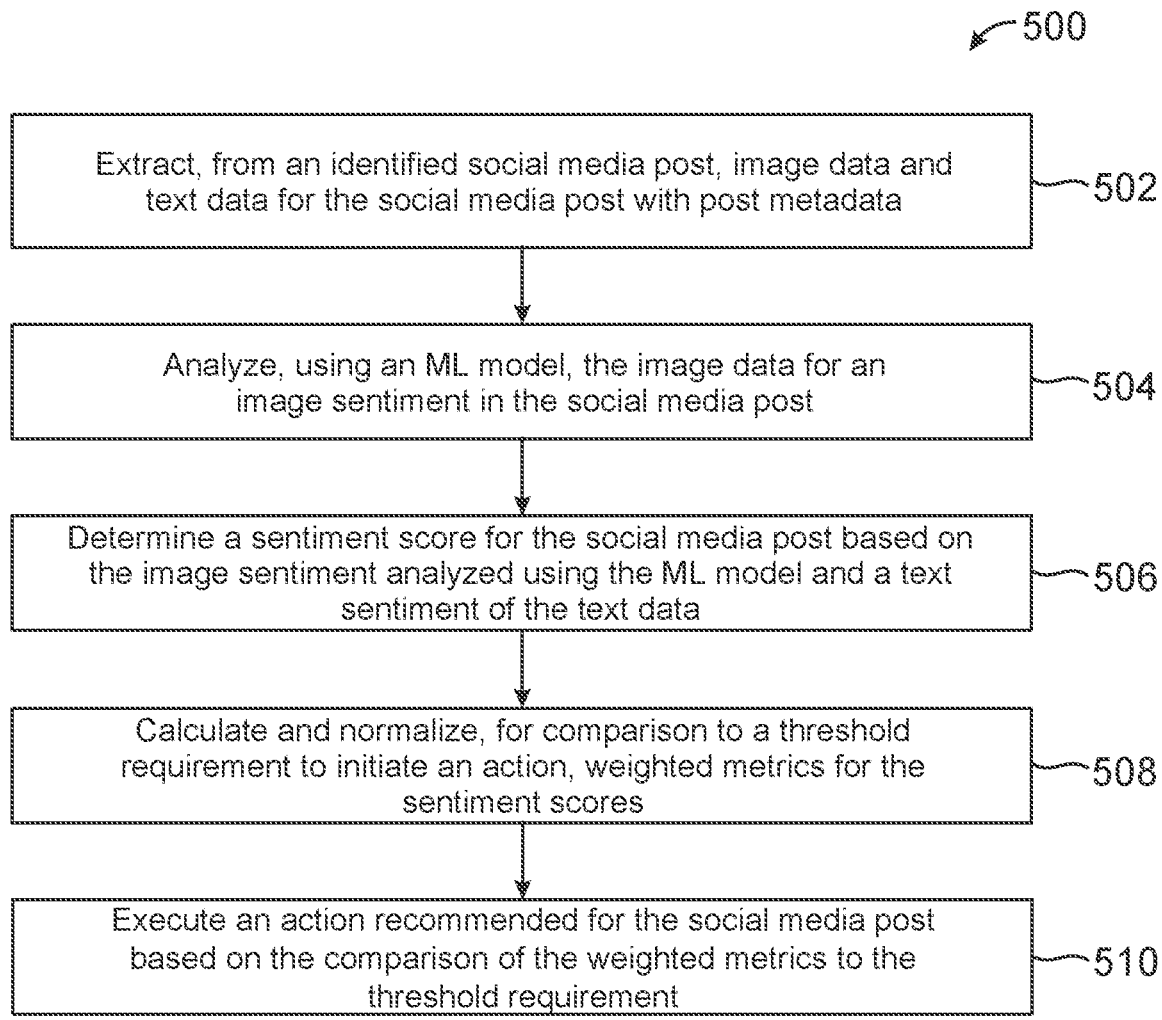
FIG. 5 is a simplified diagram of an exemplary flowchart for digital image analysis of social media posts using machine learning models for sentiment identification and recommended actions according to some embodiments.

FIG. 5 is a simplified diagram of an exemplary flowchart 500 for digital image analysis of social media posts using machine learning models for sentiment identification and recommended actions according to some embodiments. Note that one or more steps, processes, and methods described herein of flowchart 500 may be omitted, performed in a different sequence, or combined as desired or appropriate based on the guidance provided herein. Flowchart 500 of FIG. 5 includes operations for an ML system when performing sentiment analysis and action recommendation, as discussed in reference to FIG. 1-4. One or more of steps 502-510 of flowchart 500 may be implemented, at least in part, in the form of executable code stored on non-transitory, tangible, machine-readable media that when run by one or more processors may cause the one or more processors to perform one or more of steps 502-510. In some embodiments, flowchart 500 can be performed by one or more computing devices discussed in environment 100 of FIG. 1.

At step 502 of flowchart 500, from an identified social media post, image data and text data with post metadata is extracted for the social media post. A posting event to a social media platform may be detected, where a social media post is shared, uploaded, or otherwise provided on a social media platform and/or through a social data feed. The post may include image, video, and/or text data, as well as links, identifiers, hashtags, emojis or other graphics, or the like. Thus, data extraction and/or preprocessing may be used to extract image data and/or features, which may include transforming image pixels and/or pixel data to matrices and/or vectors of n-dimensionality. Text data and/or post metadata may include additional text sentiment scores and/or data for determination of image or text sentiment scores.

During training, a data set for training an ML model is received. The data set may be received for initial baseline training of the ML model and/or online training of the ML model using live data or further data sets over time. The data set may include values for different variable of ML model features, which may also be segmented by and/or correspond to data sampling and/or bagging techniques performed on the features, or a subset thereof, used to train one or more ML models. The data set may be received over a course of time during testing of the ML model. After training, the ML model may be deployed and used for sentiment analysis, for example, at step 504 where the image data is analyzed, using an ML model, for an image sentiment in the social media post. The image sentiment may be based off trained and labeled data for other images and the like. Thus, the ML model may be used to analyze image pixels and content for a sentiment by a user (e.g., based on face or body expressions, number of users, clothing or items in possession of users, background objects, and the like).

Thus, the ML model may take the extracted and/or preprocessed data from the image in the social media post and provide an output sentiment score for a sentiment in an image (e.g., positive or negative). At step 506, a sentiment score is determined for the social media post based on the image sentiment analyzed using the ML model and a text sentiment of the text data. The sentiment score may be an overall sentiment score based on one or more of the determined image sentiment score and/or a corresponding text sentiment score. The text sentiment score may be determined by the sentiment analysis system or may be provided through metadata and other textual analytics provided with the social media post. One score may be favored or ignored, or scores may be weighted and balanced, then normalized to provide an output sentiment classification and/or score.

Thus, at step 508, weighted metrics are calculated and normalized, for comparison to a threshold requirement to initiate an action, for the sentiment scores. These weighted metrics may be determined by combining sentiment scores for text and/or images with corresponding weights applied to such scores, as well as normalizing the output scores and/or metrics for a final metric that may be analyzed when determining an action to execute. At step 510, an action that is recommended for the social media post based on the comparison of the weighted metrics to the threshold requirement is executed. The action may include options such as outreach and/or engagement with a customer through a communication channel, promotion to an agent for assistance, responding to a social media post, or the like. A DCM or other agent may receive the output, where additional recommendations and/or actions may be implemented in a course of actions to remedy negative experiences and/or promote customer engagement during positive experiences.

As discussed above and further emphasized here, FIGS. 1, 2, 3, 4, and 5 are merely examples of SPA system 110 and corresponding methods for image sentiment analysis for social media posts for action recommendations, which examples should not be used to unduly limit the scope of the claims. One of ordinary skill in the art would recognize many variations, alternatives, and modifications.

Figure 6:
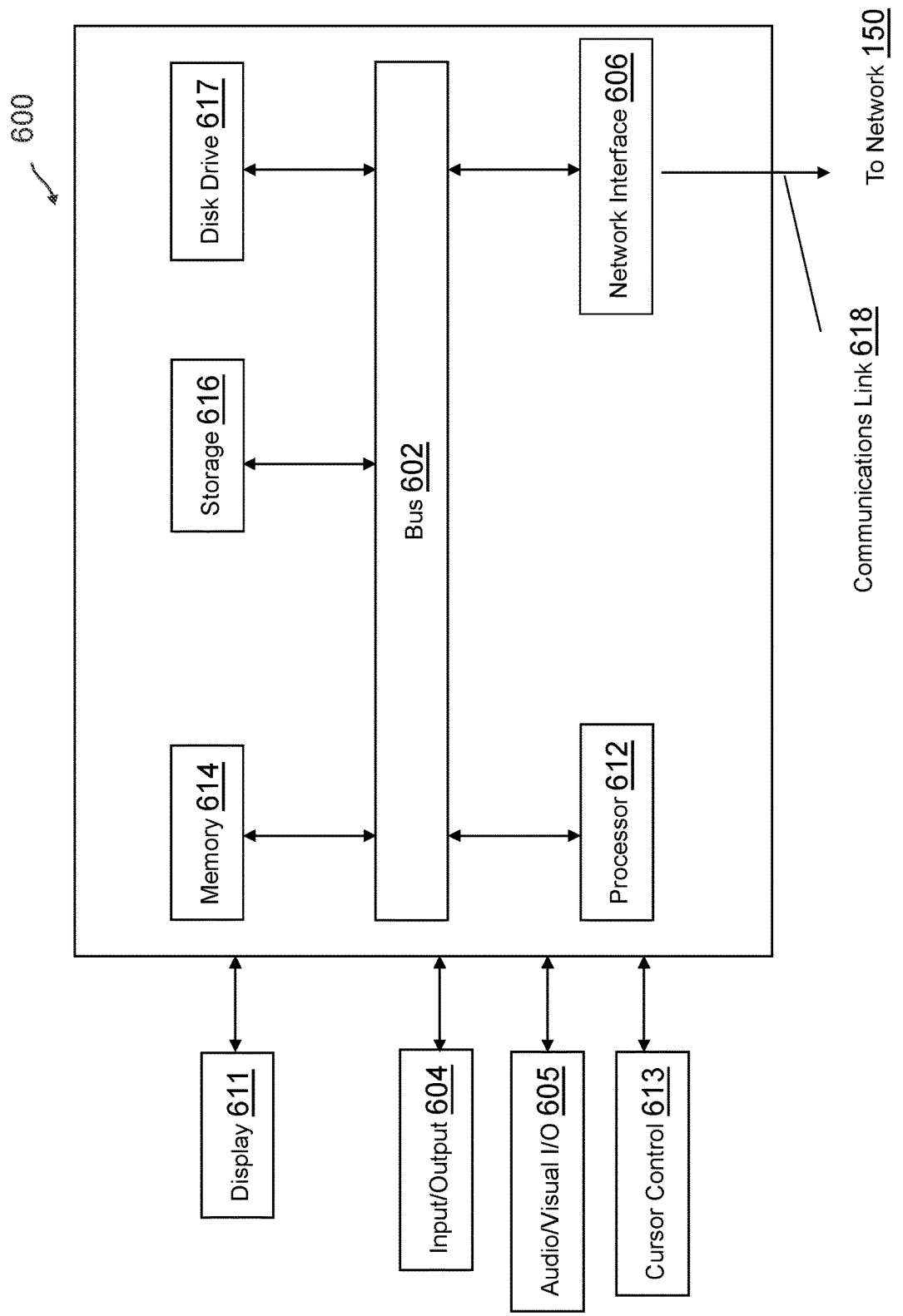
FIG. 6 is a simplified diagram of a computing device according to some embodiments.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A machine learning (ML) system configured to correlate text data with corresponding image data for image sentiment analysis, the ML system comprising:
a processor and a computer readable medium operably coupled thereto, the computer readable medium comprising a plurality of instructions stored in association therewith that are accessible to, and executable by, the processor, to perform ML image processing operations which comprise:
receiving the image data for an image posted on a social networking platform by a customer;
determining whether there is the text data associated with the image data on the social networking platform;
performing one or more image data extraction operations on the image data using an image processing ML model of an ML system that that recommends custom actions based on at least one of calculated weighted metrics of the image, the text data or historical customer data interactions;
analyzing available text data for a sentiment associated with the image using a text data analysis ML model;
determining a score for each of the image data and the text data based on one or more image data predictions according to a learned pattern in training flow;
combining the score for each of the image data and the text data based on a weighted scoring algorithm;
determining at least one of an image sentiment or a text sentiment based on the score for each of the image data and the text data and the combined score for the image data and the text data;
calculating weighted metrics of at least one of the image data or the text data based on the at least one of the image sentiment or the text sentiment;

determining historical customer data interactions of the customer from at least one other communication channels in at least one of real-time, on-demand, or from offline requests; and recommending one or more actions to take with the customer or another entity based on the weighted metrics and the historical customer data interactions.

2. The ML system of claim 1, wherein recommending the one or more recommended actions comprises:

calculating a recommendation score based on a historical customer experience with an organization through communication channels over a period of time from the historical customer data interactions and a relevant sentiment score of the image sentiment or the text sentiment from the weighted metrics, wherein the calculating applies a weighted value based on an amount of reoccurrence over the period of time multiplied by relevant domain, wherein recommending the one or more recommended actions is further based on calculating the recommendation score.

3. The ML system of claim 1, wherein the ML image processing operations further comprise:

utilizing a metadata aggregator for metadata associated with the image data, wherein the score for each of the image data and the text data is further based on the metadata comprising at least one of information associated with an uploaded social post for the image data, a unique identifier for the uploaded social post, and a quality metric.

4. The ML system of claim 1, wherein recommending one or more actions to take is further based on the image sentiment or a text sentiment associated with the text data, a company domain associated with the image, an image history associated with the image, or customer historical interaction quality for a configurable period associated with the image.

5. The ML system of claim 1, wherein the one or more actions comprise at least one of a communication outreach to a customer associated with the image data or a response to the image data on the social networking platform, and wherein the one or more actions are provided to a digital channel manager that performs the one or more actions.

6. The ML system of claim 1, wherein the image processing ML model processes an image that was rotated and resized to be aligned to a same width and height, and wherein an image pixel matrix of the image passes through a plurality of ReLU functions and pooling layers to provide a Sigmoid output function that predicts a probability for a binary sentiment.

7. The ML system of claim 1, wherein the image sentiment comprises a portion of an experience interaction score over a time period utilized to determine a customer interaction sentiment of a customer associated with the image.

8. The ML system of claim 1, wherein the ML image processing operations further comprise:

normalizing the scores for the image data and the text data prior to the combining; and performing a score analysis for a positive sentiment or a negative sentiment from user comments based on a threshold for the positive sentiment or the negative sentiment, wherein the image sentiment is based on the score analysis.

9. The ML system of claim 1, wherein at least one of the image processing ML model or the text data analysis ML model comprises a neural network model trained for sentiment analysis.

10. A method to correlate text data with corresponding image data for image sentiment analysis by a machine learning (ML) system, which method comprises:

receiving the image data for an image posted on a social networking platform by a customer;

determining whether there is the text data associated with the image data on the social networking platform;

performing one or more image data extraction operations on the image data using an image processing ML model of an ML system that that recommends custom actions based on at least one of calculated weighted metrics of the image, the text data or historical customer data interactions;

analyzing available text data for a sentiment associated with the image using a text data analysis ML model;

determining a score for each of the image data and the text data based on one or more image data predictions according to a learned pattern in training flow;

combining the score for each of the image data and the text data based on a weighted scoring algorithm;

determining at least one of an image sentiment or a text sentiment based on the score for each of the image data and the text data and the combined score for the image data and the text data;

calculating weighted metrics of at least one of the image data or the text data based on the at least one of the image sentiment or the text sentiment;

determining historical customer data interactions of the customer from at least one other communication channels in at least one of real-time, on-demand, or from offline requests; and recommending one or more actions to take with the customer or another entity based on the weighted metrics and the historical customer data interactions.

11. The method of claim 10, wherein recommending the one or more recommended actions comprises:

calculating a recommendation score based on a historical customer experience with an organization through communication channels over a period of time from the historical customer data interactions and a relevant sentiment score of the image sentiment or the text sentiment from the weighted metrics, wherein the calculating applies a weighted value based on an amount of reoccurrence over the period of time multiplied by relevant domain, wherein recommending the one or more recommended actions is further based on calculating the recommendation score.

12. The method of claim 10, further comprising:

utilizing a metadata aggregator for metadata associated with the image data, wherein the score for each of the image data and the text data is further based on the metadata comprising at least one of information associated with an uploaded social post for the image data, a unique identifier for the uploaded social post, and a quality metric.

13. The method of claim 10, wherein recommending one or more actions to take is further based on the image sentiment or a text sentiment associated with the text data, a company domain associated with the image, an image history associated with the image, or customer historical interaction quality for a configurable period associated with the image.

14. The method of claim 10, wherein the one or more actions comprise at least one of a communication outreach to a customer associated with the image data or a response to the image data on the social networking platform, and wherein the one or more actions are provided to a digital channel manager that performs the one or more actions.

15. The method of claim 10, wherein the image processing ML model processes an image that was rotated and resized to be aligned to a same width and height, and wherein an image pixel matrix of the image passes through a plurality of ReLU functions and pooling layers to provide a Sigmoid output function that predicts a probability for a binary sentiment.

16. The method of claim 10, wherein the image sentiment comprises a portion of an experience interaction score over a time period utilized to determine a customer interaction sentiment of a customer associated with the image.

17. The method of claim 10, further comprising:
normalizing the scores for the image data and the text data prior to the combining; and
performing a score analysis for a positive sentiment or a negative sentiment from user comments based on a threshold for the positive sentiment or the negative sentiment,
wherein the image sentiment is based on the score analysis.

18. The method of claim 10, wherein at least one of the image processing ML model or the text data analysis ML model comprises a neural network model trained for sentiment analysis.

19. A non-transitory computer-readable medium having stored thereon computer-readable instructions executable to correlate text data with corresponding image data for image sentiment analysis using a machine learning (ML) system, the computer-readable instructions executable to perform ML image processing operations which comprises:
receiving the image data for an image posted on a social networking platform by a customer;
determining whether there is the text data associated with the image data on the social networking platform;
performing one or more image data extraction operations on the image data using an image processing ML model of an ML system that that recommends custom actions based on at least one of calculated weighted metrics of the image, the text data or historical customer data interactions;
analyzing available text data for a sentiment associated with the image using a text data analysis ML model;
determining a score for each of the image data and the text data based on one or more image data predictions according to a learned pattern in training flow;
combining the score for each of the image data and the text data based on a weighted scoring algorithm;
determining at least one of an image sentiment or a text sentiment based on the score for each of the image data and the text data and the combined score for the image data and the text data;
calculating weighted metrics of at least one of the image data or the text data based on the at least one of the image sentiment or the text sentiment;
determining historical customer data interactions of the customer from at least one other communication channels in at least one of real-time, on-demand, or from offline requests; and
recommending one or more actions to take with the customer or another entity based on the weighted metrics and the historical customer data interactions.

20. The non-transitory computer-readable medium of claim 19, wherein recommending the one or more recommended actions comprises:
calculating a recommendation score based on a historical customer experience with an organization through communication channels over a period of time from the historical customer data interactions and a relevant sentiment score of the image sentiment or the text sentiment from the weighted metrics, wherein the calculating applies a weighted value based on an amount of reoccurrence over the period of time multiplied by relevant domain,
wherein recommending the one or more recommended actions is further based on calculating the recommendation score.

* * * * *